A. C. SISSON.
Improvement in Wire-Fences.

No 114,057.  Patented April 25, 1871.

Witnesses.  Inventor.
C. H. Poole  Arnold C. Sisson
E. W. Woodruff  by his attorney
  E. W. Woodruff

United States Patent Office.

ARNOLD C. SISSON, OF FACTORYVILLE, PENNSYLVANIA.

Letters Patent No. 114,057, dated April 25, 1871.

IMPROVEMENT IN WIRE FENCES.

The Schedule referred to in these Letters Patent and making part of the same.

*To all whom it may concern:*

Be it known that I, ARNOLD C. SISSON, of Factoryville, in the county of Wyoming and State of Pennsylvania, have invented certain new and useful Improvements in Wire Fences; and the following is a full, clear, and exact description of the same, reference being had to the accompanying drawing making a part of this specification, in which—

The object of my invention is to provide a simple, cheap, durable, and effective farm fence, more especially adapted to that portion of the country where timber is scarce, where high winds prevail, and fires often occur.

My invention consists in the arrangement of iron posts and braces anchored to a block of wood or stone which is placed in the ground.

To enable others to make and use my improved farm fence I will proceed to describe its construction, referring by letters to the accompanying drawing.

The posts A are made of flat bar iron, one and a half inch wide by half an inch thick, or of such size as to give the desired strength.

The end braces B and the side brace C are also of iron.

Figure 1:
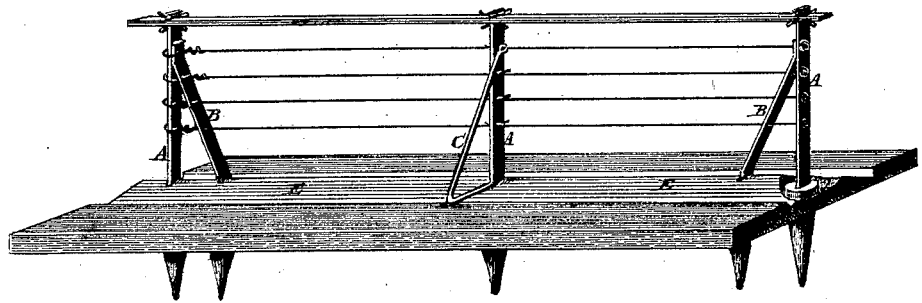
Figure 1 represents a perspective view of my improved fence, arranged on a table, representing the surface of the ground.
Figure 2:
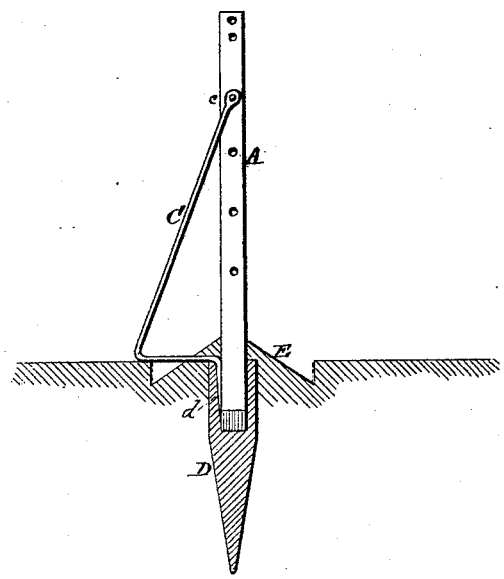
Figure 2 is a cross-section on line $x$ $x$, fig. 1, showing the attachment of the post and side brace to the block.

These posts and braces are fastened into the blocks D, which are driven into or placed in the ground, as shown in fig. 2.

The posts A and braces B have holes drilled through them at suitable distances apart, in which are placed the wires; nails are driven beside them to hold them in place; these wires serve to secure the braces to the end posts.

The side brace C also has a hole punched at its upper end, through which a wire passes and holds it to the post, the lower end being fastened in the block beside the post.

A rail, F, is placed upon the top of the posts, holes being mortised through it, through which the posts pass, and are keyed by means of nails, which are driven through holes in their upper ends above the rail.

A furrow, E, may be made by running a plow along both sides of the fence. This is done after the short posts are driven; it gives additional height to it, and also presents an obstruction which aids in protecting it from damage by cattle or fire.

Should the top rail be destroyed the fence will yet stand, as the remaining parts above ground are of iron.

The blocks D, if made of wood, may be made indestructible by charring their outer surface or coating them with asphaltum.

It will be seen that my improved farm fence is of the most durable character, that it is easily constructed, and cannot fail to give satisfaction.

Having thus fully described my invention,

What I claim as new, and desire to secure by Letters Patent, is—

The arrangement of the perforated iron post A, wires B, top rail F, and socket D with the angular iron brace C, attached at its upper end $c$, its lower end entering the socket D and serving as a wedge to secure the post, and its angle forming a bearing or support, substantially as set forth.

In testimony whereof I hereunto set my hand and affix my seal in the presence of—

A. C. SISSON. [L. S.]

Witnesses:
 GEO. C. GREEN,
 WILBER GARDNER.